United States Patent [19]

Savarimuthu

[11] 4,028,170

[45] June 7, 1977

[54] REINFORCING HOLE PUNCH DEVICE

[76] Inventor: Sundar Savarimuthu, 17 Glen Eagle Crecent, Willowdale, Ontario, Canada

[22] Filed: Aug. 3, 1976

[21] Appl. No.: 711,267

[52] U.S. Cl. .......... 156/513

[51] Int. Cl.² .......... B32B 31/00

[58] Field of Search .......... 156/513, 514, 252, 253

[56] References Cited

UNITED STATES PATENTS

| | | | |
|---|---|---|---|
| 1,068,950 | 7/1913 | Timm | 156/514 |
| 1,147,715 | 7/1915 | Gall | 156/513 |
| 2,591,935 | 4/1952 | Heigl | 156/513 |
| 3,441,462 | 4/1969 | Bogan et al. | 156/513 |
| 3,558,254 | 1/1971 | Cahill | 156/513 |

*Primary Examiner*—Douglas J. Drummond
*Attorney, Agent, or Firm*—Allen D. Brufsky

[57] ABSTRACT

A reinforcing hole punch device for punching a hole in a sheet of material and applying an annularly shaped reinforcing element to the sheet includes a base having a channel therethrough and a large opening therein, wherein the channel communicates with the opening. A strip of paper has reinforcing elements disposed thereon. A sheet of material to be punched is insertable into the opening. The top of the base has a plurality of apertures therein, wherein each aperture receives a punch element therein. A mechanism is provided for advancing the tape each time the punch element is depressed.

10 Claims, 5 Drawing Figures

REINFORCING HOLE PUNCH DEVICE

BACKGROUND OF THE INVENTION

A number of U.S. patents relate to labeling machines. These U.S. patents are U.S. Pat. Nos.: 954,321 to Meyer; 998,164 to Feist; 2,586,835 to Leger; 3,077,919 to Krueger; 3,243,329 to Anderegg; 3,793,114 to Thomas; and 3,890,191 to Mayer. These U.S. patents are non-applicable to my present invention.

SUMMARY OF THE INVENTION

My present invention relates to a unique and novel device for punching a hole in a sheet while simultaneously applying a reinforcing element to the sheet around the punched hole.

An object of my present invention is to provide a device which punches a hole in a sheet while simultaneously applying a reinforcing element to the sheet around the puched hole.

A further object of my present invention is to provide a means for automatically advancing a strip of paper through the device, wherein the strip has the reinforcing elements disposed thereon.

Briefly, my present invention comprises a base having a channel therethrough and a large opening therein, wherein the channel communicates with the opening. A strip of paper has reinforcing elements disposed thereon. A sheet of material to be punched is insertable into the opening. The top of the base has a plurality of apertures therein, wherein each aperture receives a punch element therein. A mechanism is provided for advancing the tape each time the punch element is depressed.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
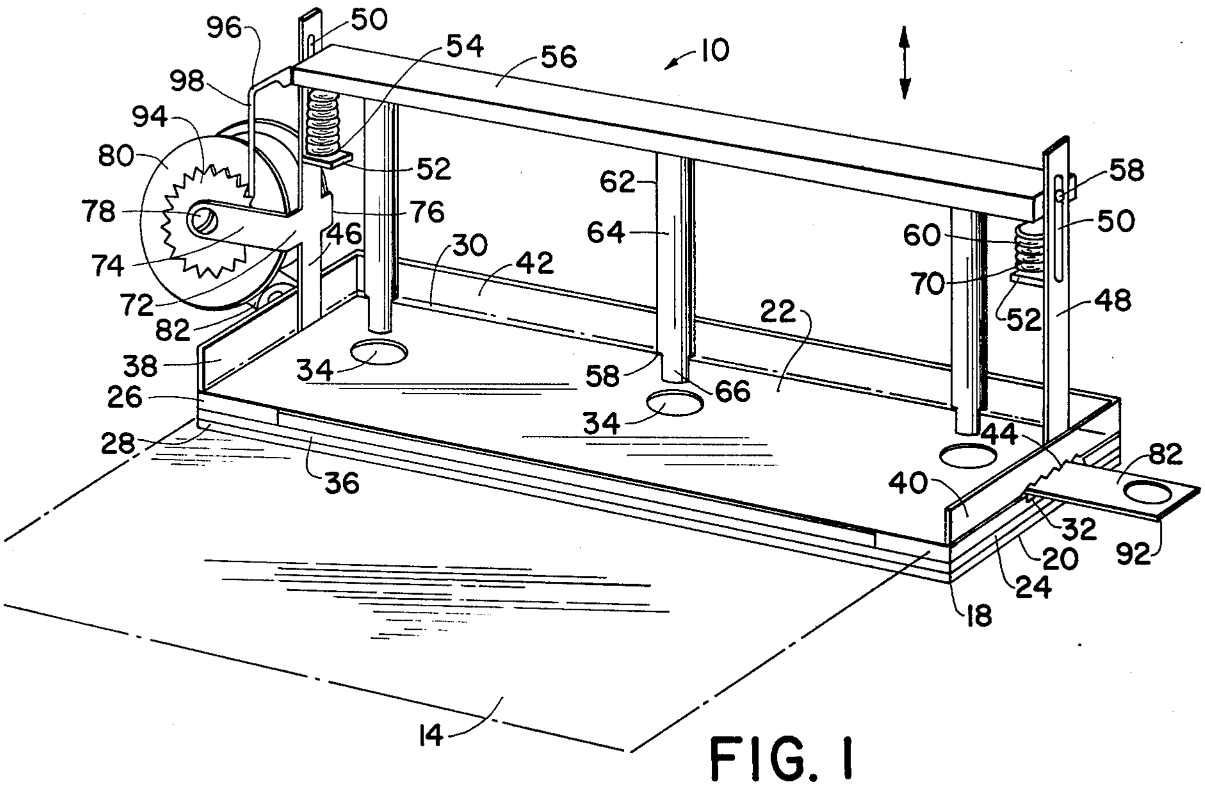
FIG. 1 illustrates a front perspective view of a reinforcing punch hole device.
Figure 2:
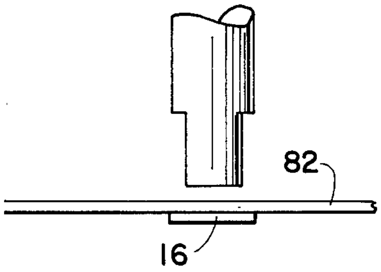
FIG. 2 shows a portion of the punch element just before penetration of a strip of paper.
Figure 3:
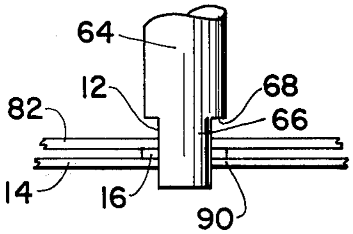
FIG. 3 shows a portion of the punch element penetrating the strip of paper.
Figure 4:
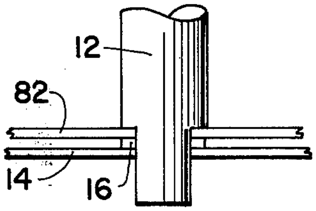
FIG. 4 shows a portion of the punch element having penetrated the strip of paper.
Figure 5:
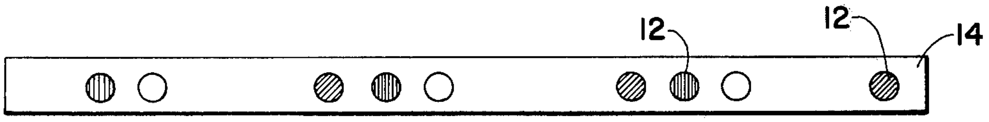
FIG. 5 shows a top view of the punched strip.

Turning now descriptively to the drawings, in which similar reference characters denote similar elements throughout the several views, FIG. 1 shows a reinforcing hole punch device 10 used for punching a hole 12 in a piece of paper 14 while simultaneously applying an annularly shaped reinforcing element 16 onto the paper 14 and around the hole 12. The device 10 comprises a base 18 having a bottom 20, a transparent top 22, a pair of upwardly extending end walls 24, 26, an upwardly extending forward wall 28, and an upwardly extending rear wall 30. The base 18 has a flat channel 32 extending therethrough from end 24 to end. The top 22 has a plurality of circularly shaped apertures 34 therein, wherein each aperture extends downwardly into the base 18 to communicate with the channel 32. The base 18 has a rectangularly shaped opening 36 therein, wherein opening 36 extends inwardly from the forward wall 28 in a plane parallel to the top 22 such that channel 32 and opening 36 communicate with each other. A pair of end flange members 38, 40 are affixed to each end of the base 18, wherein the members 38, 40 extend upwardly from the top 22 of the base 18. A rear flange member 42 extends upwardly from the rear of the base 18. A lower center edge of flange member 38 has a sawtooth cutout 44 therein, wherein cutout 44 aligns with the end of channel 32 at end wall 24. A pair of rectangularly shaped end arms 46, 48 are mounted onto the base 18, wherein one of the arm members 46, 48 extends upwardly from each end of the base 18. Each arm member 46, 48 has an elongated slotted opening 50 therethrough. A rectangularly shaped stop plate 52 is affixed perpendicularly onto a center inside surface of each arm member 46, 48, wherein each plate 52 has a center hole 54 therethrough. Each end of an elongated rectangularly shaped bar member 56 has a guide pin 58 disposed thereon, wherein one guide pin 58 is slideably disposed in each opening 50 of each arm member 46, 48. To the lower surface of bar member 56 at each end thereof is affixed perpendicularly a rod element 60, wherein one rod element 60 is slideably disposed through each center hole 54 of each stop plate 52. A plurality of punch elements 62 are affixed perpendicularly to a lower surface of bar member 56, wherein each punch element 62 is aligned over one of apertures 34. Each punch element comprises an upper 64 and a lower 66 cylindrically shaped section, wherein the diameter of the upper section 64 is greater than that of the lower section 66 thereby forming a shoulder 68 between the sections 64, 66. Each rod element 60 has a spring member 70 disposed thereon, wherein each spring member 70 communicates between one of the stop plates 52 and the lower surface of bar member 56. A bracket assembly 72 having two outwardly extending arms 74, 76 is mounted onto arm member 46. An axle rod 78 is journaled through arms 74, 76. A reel member 80 is mounted onto the axle rod 78, wherein the reel member 80 has a strip 82 of paper wound thereon. The two surfaces of strip 82 have a release coating 84 deposited thereon. A plurality of reinforcing cloth like pads which are the reinforcing elements 16 are adhesively secured to the release coating 84 on a lower surface of the strip 82. The outer free surface of each pad 86 has a pressure sensitive adhesive layer 90 deposited thereon. The free end 92 of the strip 82 extends through channel 32. A ratchet wheel 94 is mounted onto axle rod 78. An L-shaped member 96 is affixed onto one end of bar member 56, wherein the longer downwardly extending vertical leg 98 of member 96 engages the wheel 94. As bar member 56 is depressed downwardly the wheel 94 is turned by the engagement of leg 98 thereby causing the rotation of reel member 80. As reel member 80 is rotated, strip 82 is fed into channel 32. A sheet of paper 100 is fed into opening 36. The bar member 56 is depressed causing each punch element 62 to cut a hole through strip 82, pad 86 and sheet 100. The shoulder 68 of each punch element 62 applies a pressure onto strip 82 and pad 86 thereby causing the pad 86 to be adhesively secured to the sheet 100 as shown in FIGS. 1–3.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A reinforcing hole punch device for punching a hole in a sheet of material and applying an annularly shaped reinforcing element to said sheet around said formed hole in said sheet, which comprises:

a. a base having a bottom, a plurality of upwardly extending walls, and a top, said base having a channel therein, said channel extending between two said walls, another said wall having an elongated opening therein, said opening extending inwardly into said base to communicate with said channel, said top of said base having at least one circular aperture therein, said circular aperture extending downwardly into said base to communicate with said channel, said elongated opening adapted to receive said sheet therein;

b. a pair of arm members, one arm member affixed to each end of said base and extending upwardly therefrom, each said arm member having an elongated slot therethrough;

c. a rectangularly shaped bar member having a pair of distal ends;

d. a pair of pin elements, each said pin element affixed linearly onto one said distal end of rectangularly shaped bar member, each said pin element slideably disposed in one said elongated slot of one said arm member;

e. means for restricting down movement of said bar member between said arm members;

f. at least one punch element perpendicularly affixed to said bar member, said punch element received in said aperture upon a downward movement of said bar member; and g. means for inserting a plurality of reinforcing elements into said channel for application of said reinforcing elements to said sheet.

2. A device according to claim 1, wherein said inserting means further comprises a plurality of said reinforcing elements disposed of a strip of material, said strip insertable into said channel.

3. A device according to claim 2, wherein each said reinforcing element has an adhesive coating deposited thereon.

4. A device according to claim 2, further comprising:

a. a bracket member having a pair of arms, said bracket member mounted on one of said arm members;

b. an axle rod journaled through said arms of said bracket member; and c. a reel mounted on said axle rod, said reel receiving said strip thereon, said strip insertable into said channel of said base.

5. A device according to claim 4, further comprising a means for rotating said reel upon said downward movement of said bar member.

6. A device according to claim 5, wherein said rotating means further comprises:

a. a ratchet wheel mounted on said axle rod; and b. an L-shaped member communicating with said bar member, said L-shaped member cooperating with said ratchet wheel for rotating said ratchet wheel a predetermined quantity upon said downward movement of said bar member.

7. A device according to claim 1, wherein said top of said base is transparent.

8. A device according to claim 1, wherein said restricting means further comprises:

a. a pair of stop plates, each said stop plate having a hole therethrough, one said stop plate mounted on each said arm;

b. a pair of rod elements, one said rod element mounted at each said end of said bar member, each said rod element slideably disposed through said hole of one of said stop plates; and c. a pair of spring elements, one said spring element disposed on each said rod element.

9. A device according to claim 1, further comprising a means for tearing said strip after punching of said strip.

10. A device according to claim 1, wherein said punch element is cylindrically shaped.

* * * * *